United States Patent

Finney

Patent Number: 5,366,194
Date of Patent: Nov. 22, 1994

[54] UNIVERSAL MOUNTING BRACKET FOR ENGINEERING SURVEYING INSTRUMENTS

[76] Inventor: William Finney, 3130 Beal St. NW., Warren, Ohio 44485

[21] Appl. No.: 83,298

[22] Filed: Jun. 29, 1993

[51] Int. Cl.$^5$ .............................................. G03B 17/00
[52] U.S. Cl. .................. 248/218.4; 354/293; 248/187; 248/300
[58] Field of Search ............ 248/300, 187, 177, 231.7, 248/218.4, 674, 274, 911, 912, 247, 248, 906; 354/293, 294; 352/243

[56] References Cited

U.S. PATENT DOCUMENTS

| | | | |
|---|---|---|---|
| 2,614,471 | 10/1952 | Markowitz | 354/293 |
| 2,771,014 | 11/1956 | Tolcher | 354/293 X |
| 2,839,668 | 6/1958 | Mills | 354/293 X |
| 3,057,250 | 10/1962 | Griffith . | |
| 3,423,056 | 1/1969 | Welt | 248/187 |
| 3,731,897 | 5/1973 | Price | 354/293 X |
| 3,985,326 | 10/1976 | Kittstein . | |
| 4,081,814 | 3/1978 | Bulland | 248/187 X |
| 4,133,607 | 1/1979 | Mansho | 354/293 X |
| 4,553,872 | 11/1985 | Chandra et al. | 248/231.7 X |
| 4,621,433 | 11/1986 | Takeuchi et al. . | |
| 4,771,300 | 9/1988 | Bryan | 354/293 X |
| 5,073,788 | 12/1991 | Lingwall | 354/293 X |
| 5,100,089 | 3/1992 | McLemore, Jr. et al. . | |

OTHER PUBLICATIONS

David White Column Clamp catalog sheet p. 9.

*Primary Examiner*—Karen J. Chotkowski
*Attorney, Agent, or Firm*—Harpman & Harpman

[57] ABSTRACT

A universal support and mounting bracket for surveying instruments that provides a portable self-contained secure and stable mounting platform on structural support columns and other non-uniform surfaces. The mounting bracket device has multiple mounting areas to accept a variety of surveying and siting instruments.

3 Claims, 2 Drawing Sheets

UNIVERSAL MOUNTING BRACKET FOR ENGINEERING SURVEYING INSTRUMENTS

BACKGROUND OF THE INVENTION

1. Technical Field

This device relates to mounting devices for high precision surveying and engineering instruments to provide adequate support and positioning of the instruments in the field.

In surveying for alignment of large buildings and equipment such as overhead cranes and the like it is necessary to position optical and electronic siting devices on or adjacent to the structure which is difficult, when in use most such devices are mounted on a three legged tripod. Problems are incurred when trying to position the tripod on narrow beam members so that proper instrument location for siting can be achieved.

2. Description of Prior Art

Prior art devices of this type have relied on a variety of different configurations used to support surveying and alignment instruments including a column clamp known in the art as a "David White Column Clamp" see enclosed catalog sheet print, page 9. The column clamp has two mounting clamps slideably positioned on a pair of threaded end legs engageable into a column mount bracket that forms a corner configuration on the column.

Other examples of mounting devices are seen in U.S. Pat. Nos. 5,100,089, 4,621,433, 3,985,326 and 3,057,250.

In U.S. Pat. No. 5,100,089 a mason's level holder is disclosed wherein a level holder is shown having multiple slots, for support of the level in two directions on a vertical or horizontal scaffolding member.

U.S. Pat. No. 4,621,433 is directed towards a vertically detecting apparatus for plumbing columns wherein two targets are mounted on the column to define a plumb i.e. vertical alignment therebetween.

A bracket device is disclosed in U.S. Pat. No. 3,985,326 in which a plate-like extension body with a singular mounting surface located on one end is shown. Clamps extend from the extension body to engage a portion of the building column.

U.S. Pat. No. 3,057,250 defines an alignment device and locater for blocks and cylinders with use of optical instruments. The device is strapped onto the corner of a column or block to provide a reference siting guide that corresponds to the relative position of the block with the use of surveying instruments cited optically therethrough.

SUMMARY OF THE INVENTION

A mounting bracket for positioning, surveying and siting engineering instruments onto vertical support columns and related surfaces. The mounting bracket has multiple instrument mounting areas on a angle bar that can be reversed, inverted and repositioned on a variety of vertical surfaces. Independent clamps are used to secure the mounting bracket to the vertical structure surface. A surveying instrument can be readily positioned on the mounting areas to provide a solid secure and safe positioning of the instrument in relation to and on the work surface.

DESCRIPTION OF THE PREFERRED EMBODIMENT

Figure 1:
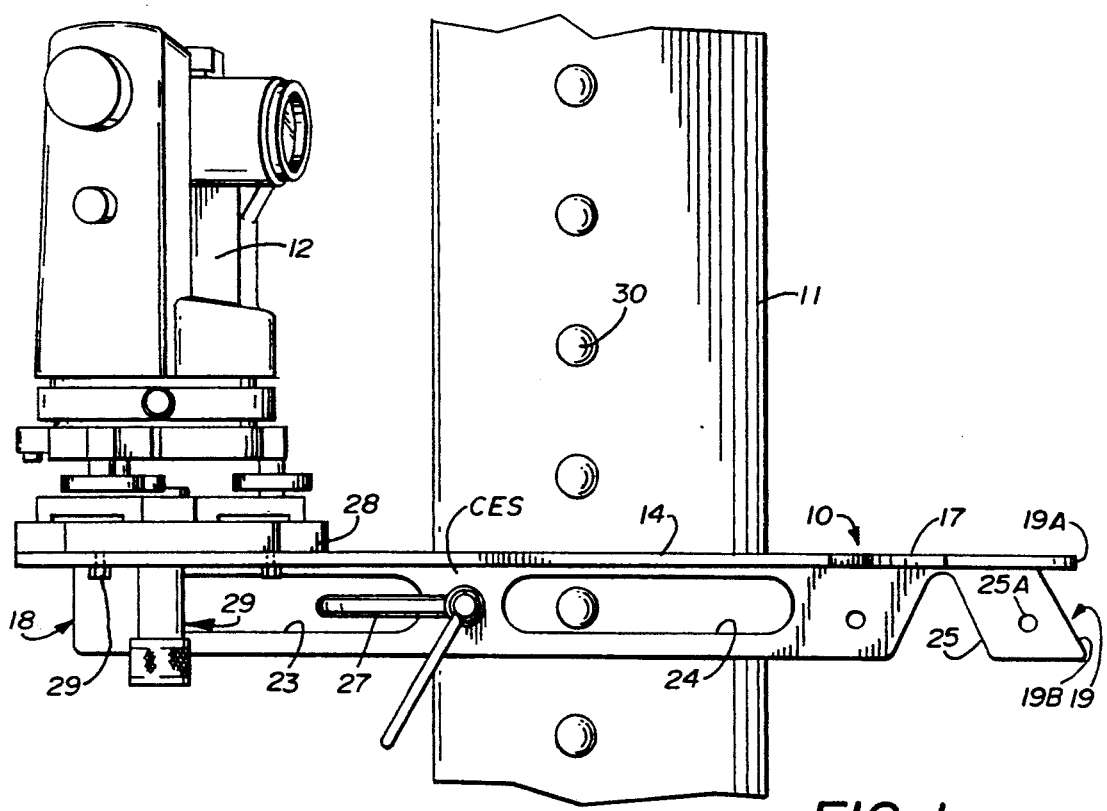
FIG. 1 is a perspective view of the mounting bracket secured to an upstanding structural member with a surveying instrument mounted thereon.

Referring to FIG. 1 of the drawings, a reversible mounting bracket 10 can be seen mounted to a vertically aligned structural element 11 and supporting a surveying instrument 12 thereon.

Figure 2:
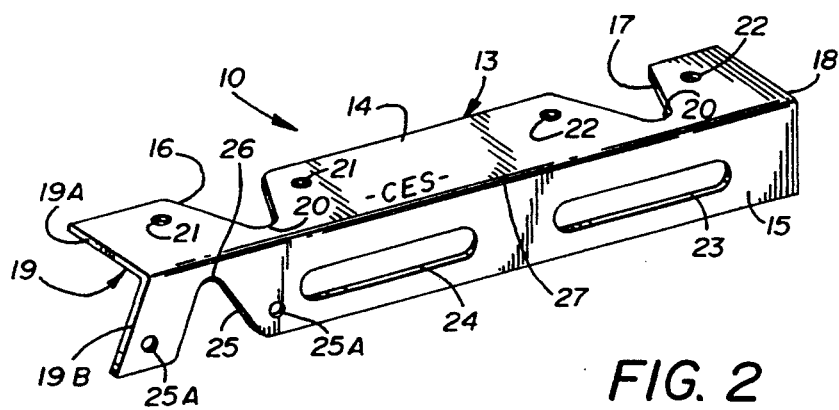
FIG. 2 is a perspective view of the mounting bracket.

Referring to FIG. 2 of the drawings, the mounting bracket 10 has an elongated angular body member 13 of a uniform thickness having a first angle portion 14 and a second angle portion 15 extending at right angles therefrom. A pair of longitudinally spaced V-shaped mounting notches 16 and 17 are positioned in oppositely disposed relation to one another in the first angle portion, each being inwardly of the first angle portion respective free ends 18 and 19. Each of said mounting notches 16 and 17 have a generally V-shaped configuration extending into the first angle portion with a terminal point 20 adjacent to said second angle portion 15. Pairs of spaced apertures are located adjacent said respective notches 16 and 17 at 21 and 22.

Referring now to FIGS. 1-4 of the drawings, the second angle portion 15 has a pair of longitudinally spaced elongated mounting apertures at 23 and 24 within that are inwardly of said mounting bracket's free end 18. A second V-shaped mounting notch 25 is positioned between said respective free end 19 and the mounting aperture at 24 extending into said second angle portion 15 terminating at 26 adjacent said first and second angle intersection at 27. The mounting notch at 25 has oppositely disposed apertures at 25A for mounting purposes which will be described in greater detail later.

Figure 3:
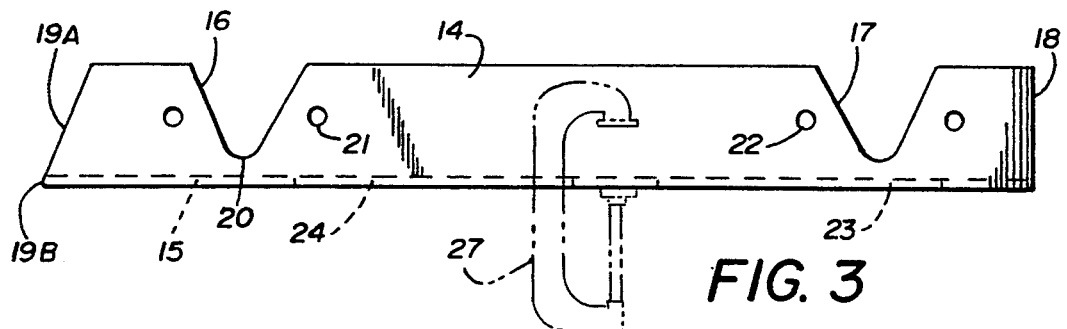
FIG. 3 is a top plan view of the mounting bracket.
Figure 4:
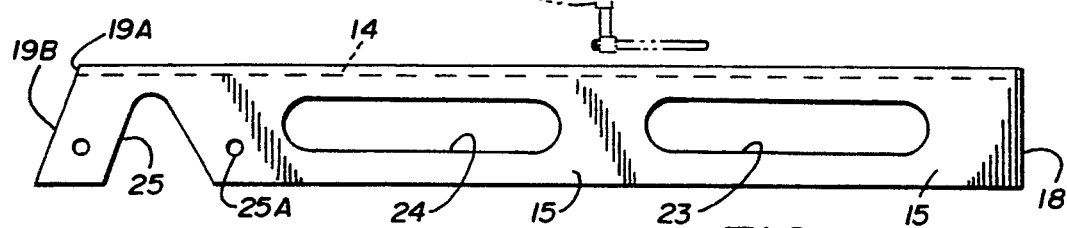
FIG. 4 is a side plan view of the mounting bracket.
Figure 5:
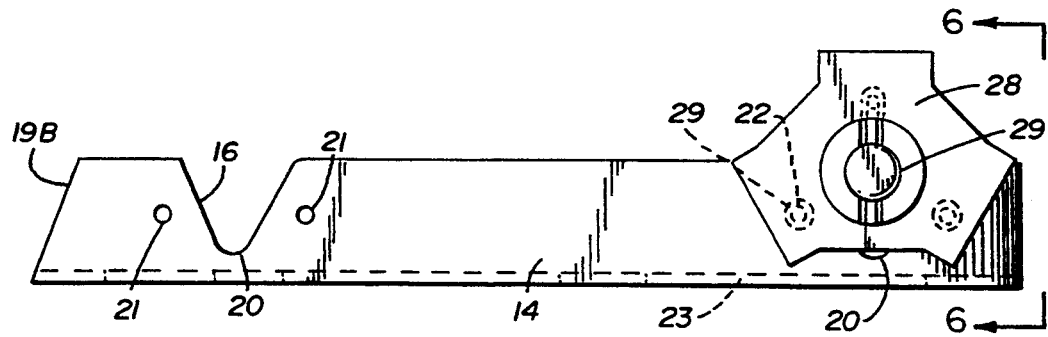
FIG. 5 is a top plan view of the mounting bracket with an instrument mounting base secured thereto.
Figure 6:
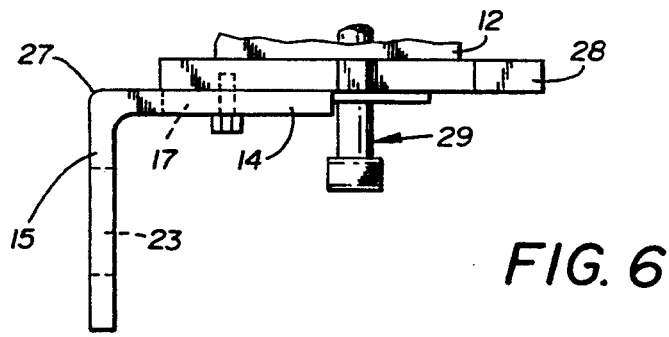
FIG. 6 is an end plan view on lines 6—6 of FIG. 5.

Referring to FIGS. 3 and 4 of the drawings, it will be seen that the mounting bracket's free end 19 has angularly disposed edges 19A and B on respective first and second angle portions 14 and 15 as hereinbefore described.

Referring back to FIG. 1 of the drawings, the mounting bracket 10 is shown in use temporarily secured to the structural element 11 by a C clamp 27 (which is well known within the art) extending through the elongated mounting aperture at 24. The surveying instrument 12 is secured to the mounting bracket 10 through the mounting notch 17 by a base plate 28 and associated fasteners 28A extending through respective apertures at 22 within the first angle mounting portion 14 shown in dotted lines in the base plate 28.

Referring to FIGS. 1-6 of the drawings, a threaded mounting shaft assembly 29 extends through the base plate 28 and a mounting fitting 30 that is secured to the base plate 28. The mounting shaft assembly 29 is threadably engaged to the surveying instrument 12 securing same to the base plate 28.

The base plate 28, mounting shaft assembly 29 and associated fasteners 28A are typical for surveying instruments of this type and are well known and available within the industry.

It will be evident from the above description that with the multiple instrument mounting areas at 16, 17, and 25 that the mounting bracket 10 can be adapted to fit a variety of different mounting surfaces such as the structural element 11 which has a plurality of longitudinally positioned and spaced rivets 30 or other obstacles that can be bridged by the mounting apertures at 23 and 24 while still providing multiple clamping engagement surfaces CES on the first and second angle portions 14 and 15 as hereinbefore described.

Thus, it will be seen that a new and useful universal mounting bracket has been illustrated and described and it will be obvious to those skilled in the art that various changes and modifications may be made therein without departing from the spirit of the invention, therefore I claim:

1. A mounting bracket device for supporting, engineering and surveying instruments on a support column and related surfaces comprises; an elongated body member having a first right angular portion forming a mounting surface, a second right angular portion extending from said first right angular portion, said first and second right angular portions are of an equal known thickness, a pair of oppositely disposed mounted notches on said first right angular portion and a single mounting notch on said second right angular portion, said mounting notches are V-shaped extending inwardly on said respective right angular mounting portions, said first right angular portion has opposing free ends, multiple edges on said free ends, one of said edges is angularly disposed toward said adjacent mounting notch defining an angular inclination inwardly from said respective free ends, said second right angular portion has opposing free end edges one of said edges is angularly disposed towards said adjacent mounting notches, a pair of elongated longitudinally spaced mounting apertures on said second right angular portion defining mounting areas therebetween, means for securing said elongated body member to a support column and related surfaces, means for securing said surveying instrument on said respective mounting notches.

2. The mounting bracket device of claim 1 wherein said means for securing said surveying instrument on said mounting notches comprises in combination, spaced multiple aligned apertures adjacent said mounting notches, said aligned apertures positioned midway along said notches, an instrument base plate secured over said notches by multiple fasteners extending through said aligned apertures in said respective first and second right angular portions of said elongated body member.

3. The mounting bracket device of claim 2 wherein said base plate has a mounting shaft assembly, said mounting shaft assembly removably secured to said base plate and threadably engageable within said surveying instrument.

* * * * *